(12) United States Patent
Singh et al.

(10) Patent No.: US 11,449,409 B2
(45) Date of Patent: Sep. 20, 2022

(54) SCHEMA INFERENCE AND LOG DATA VALIDATION SYSTEM

(71) Applicant: salesforce.com, inc., San Francisco, CA (US)

(72) Inventors: Sahibdeep Singh, San Francisco, CA (US); Linda Wei, San Francisco, CA (US); Ahmet Bugdayci, Los Altos, CA (US); Mario Sergio Rodriguez, Santa Clara, CA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 17/155,670

(22) Filed: Jan. 22, 2021

(65) Prior Publication Data
US 2022/0237101 A1 Jul. 28, 2022

(51) Int. Cl.
*H04L 12/24* (2006.01)
*G06F 11/34* (2006.01)
*G06F 11/30* (2006.01)

(52) U.S. Cl.
CPC ...... *G06F 11/3476* (2013.01); *G06F 11/3006* (2013.01); *G06F 11/3409* (2013.01); *G06F 11/3452* (2013.01)

(58) Field of Classification Search
CPC ............. G06F 11/3476; G06F 11/3006; G06F 11/3409; G06F 11/3452
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

Office Action dated Apr. 8, 2022 for U.S. Appl. No. 17/155,810 (pp. 1-28).

*Primary Examiner* — Kim T Nguyen
(74) *Attorney, Agent, or Firm* — Kwan & Olynick LLP

(57) ABSTRACT

Systems and methods are described for generating metrics from log data items, automatically inferring one or more schemas based at least in part on analyzing samples of the log data items, validating samples of the log data items against the one or more schemas to detect log data item errors, and analyzing the log data item errors according to metrics analytics rules to determine an effect of the log data item errors on a quality measurement of the metrics.

20 Claims, 8 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,697,316 B1 * | 7/2017 | Taylor ................. G06F 11/3068 |
| 11,089,108 B2 | 8/2021 | Shah |
| 11,226,964 B1 * | 1/2022 | Cairney ............ G06F 16/24553 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0288414 A1 | 12/2007 | Barajas |
| 2009/0177744 A1 | 7/2009 | Marlow et al. |
| 2010/0017262 A1 | 1/2010 | Iyer |
| 2011/0066615 A1 | 3/2011 | Pradhan |
| 2018/0300296 A1 | 10/2018 | Ziraknejad |
| 2021/0098099 A1 | 4/2021 | Neumann |
| 2021/0365643 A1 | 11/2021 | Agrawal |

\* cited by examiner

SCHEMA INFERENCE AND LOG DATA VALIDATION SYSTEM

TECHNICAL FIELD

One or more implementations relate to performance measurement and monitoring in cloud computing environments, and more specifically, to schema inference and log data validation in a cloud computing system.

BACKGROUND

"Cloud computing" services provide shared resources, software, and information to computers and other devices upon request or on demand. Cloud computing typically involves the over-the-Internet provision of dynamically scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

One technique used to improve cloud computing services is to generate performance measurements called metrics that represent user engagements and service performance. Metrics are typically computed from one or more events stored in a log for each user interface interaction or performance measurement. In some systems, log data is represented as "free form" text as a collection of key-value pairs. Developers of applications (being run in the cloud computing system) generating the log data typically have the flexibility to log any attributes regarding user interface interactions or performance measurements, without being restricted to a fixed set of attributes with a defined format. This flexibility of using key-value pairs to describe event attributes is convenient for the developers of those logs. However, this lack of consistent formatting of events in logs creates problems for downstream applications and system monitoring tools that need to consume those events.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Embodiments of the present invention comprise a method and apparatus to generate metrics measuring performance of user interface (UI) interactions of a computing system from log data items recording performance of the UI interactions, automatically infer one or more schemas based at least in part on analyzing samples of log data items, validate samples of log data items against the schemas to detect log data errors, and analyze the log data errors according to metrics analytics rules to determine the effect of log data errors on a quality measurement of the metrics.

Figure 1:
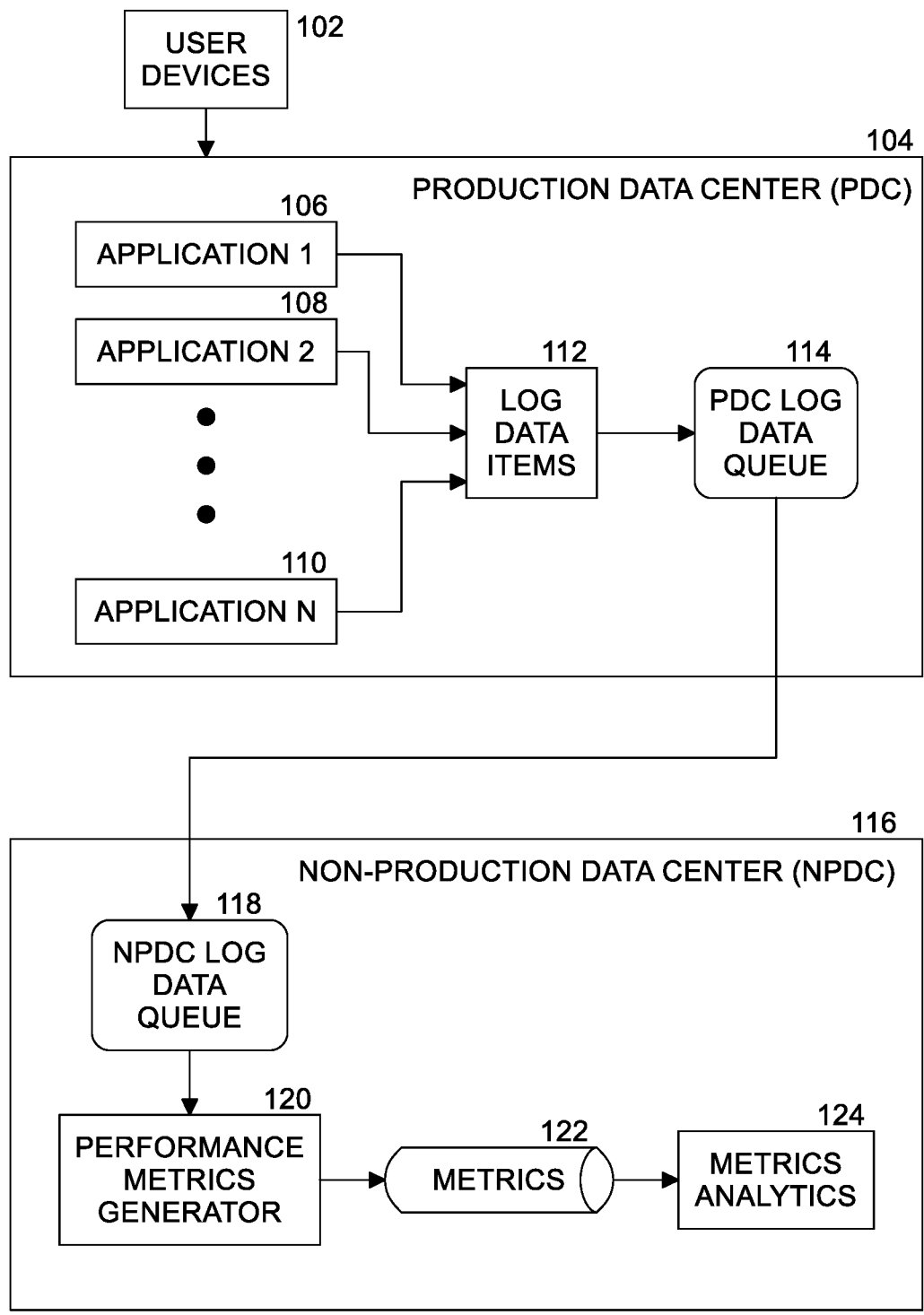
FIG. 1 illustrates an example computing environment according to some embodiments.

FIG. 1 illustrates an example computing environment 100 according to some embodiments. At least one production data center (PDC) 104 in a cloud computing environment comprises a plurality of conventional computer servers, storage devices, and network interfaces (not shown) to run computer applications for users. Users interact with user devices 102 to access the applications running in the PDC over one or more computer or communications networks. Examples of user devices include laptop and desktop personal computers, smart phones, tablet computers, personal digital assistants (PDAs), smart home appliances, home networking equipment, and so on. PDC 104 runs a plurality of applications 1 106, 2 108, . . . N 110, where N is a natural number. In some situations, N may be very large—millions or even tens of millions of instances of applications being accessed by millions or tens of millions of users worldwide. In some scenarios, PDC 104 is operated by a cloud service provider (CSP) and comprises a plurality of production data centers distributed in sites throughout the world. In one embodiment, at least one application is a search service. In some embodiments, there are multiple PDCs.

In order to measure the performance of applications 106, 108, . . . 110, data is collected from the applications. In one embodiment, applications 106, 108, . . . 110 are instrumented by application developers to provide log data items 112. Log data items 112 comprise any information relating to the applications that can be measured to assess system performance of PDC 104 and/or the applications. For example, when an application, such as application 2 108 for example, is a search application, log data items 112 may include user typing actions (the user entering text using a physical or virtual keyboard, for example), mouse selections (e.g., clicks), mouse hovers, search terms, hyperlink selections (clicks), etc. Each log data item 112 may include a plurality of fields such as log type, attributes, time stamp, etc. In some embodiments, the format of each log data item is a "free form" text as determined by the developer of the application generating the log data item. In some embodiments, there is no universal format of the log data items, and thus they may be in any format. There may be any number of log data items 112 generated by applications over a selected period of time. In some scenarios, the number of log data items generated may be extremely large, perhaps in the millions, tens of millions, hundreds of millions, or even billions of log data items in a plurality of PDCs over a selected period of time (which may be a minute, an hour, a day, a week, a month, a quarter, a year, etc.).

As log data items 112 are generated by the applications, the log data items are inserted into at least one PDC log data queue 114. In one embodiment, the at least one PDC log data queue 114 is implemented as a Kafka® message queue available from the Apache® Software Foundation on the Internet at kafka.apache.org, although other message queues may also be used. Apache® Kafka® is an open-source stream-processing software platform developed by the Apache® Software Foundation, written in Scala and Java. The project aims to provide a unified, high-throughput, low-latency platform for handling real-time data feeds.

At least one non-production data center (NPDC) 116 communicates with PDC 104 to read log data items 112 from the at least one PDC log data queue 114. Log data items 112 obtained from the at least one PDC log data queue 114 of PDC 104 are stored in NPDC log data queue 118 in NPDC 116. In one embodiment, NPDC log data queue 118 is also a Kafka® message queue, although other message queues may also be used. In an embodiment, NPDC 116 is situated at a different location than the at least one PDC 104. In another embodiment, NPDC 116 is situated at the same location as at least one of the PDCs 104. In an embodiment, NPDC 116 does not run applications for access by user devices 102, but instead runs applications and/or tools for research and development activities, data center monitoring activities, and so on.

Performance metrics generator 120 reads log data items from NPDC log data queue 118 and generates metrics 122 representing measurements of the performance of applications by PDC 104. Metrics 122 may be input to metrics analytics 124. Metrics analytics 124 uses metrics 122 to present information to systems administrators of NPDC 116 and/or PDC 104 to allow the systems administrators to manage PDC 104 to provide better service to user devices 102. In an embodiment, metrics analytics 124 includes a visual dashboard capability representing current operating attributes of PDC 104. In an embodiment, metrics analytics 124 includes machine learning (ML) processes to analyze metrics 122 to improve cloud computing services to user devices 102. In an embodiment, metrics analytics 124 automatically communicates with PDC 104 to instruct the PDC to change one or more operating characteristics of the PDC based on metrics 122. In some embodiments, metrics analytics 124 is replaced by any program for analyzing and/or interpreting metrics 122.

In one embodiment, each UI interaction event or performance event is represented as a JavaScript object notation (JSON) object containing a collection of key-value pairs. There is no schema defined for the JSON objects, so the applications 106, 108, ... 110 executing in PDC 104 of the cloud computing environment that are generating the log data items have the flexibility to log any attributes in "free form" text (e.g., a list of text strings separated by commas) without being restricted to a fixed set of attributes.

This flexibility of using key-value pairs to describe event attributes in log data items is convenient for the producers of those logs (e.g., those applications being assessed such as application 1 106, application 2 108, ... application N 110). However, this flexibility creates problems for downstream applications that need to consume those event attributes, such as performance analysis applications (e.g., metrics analytics 124).

In some embodiments, performance metrics generator 120 system generates metrics 122 based on UI interactions and performance events logged by applications. Changes, intentional or not, in the instrumentation such as attribute structure changes or unexpected attribute values can have a negative impact on the quality of the metrics 122 used to monitor and update the cloud computing environment. Many times those changes go unnoticed until a later time, because those changes don't often lead to "hard" failures (like exceptions or causing a visible failure to an application program (such as application 1 106, application 2 108, ... application N 110) being used by the user, which would prompt the user to generate a case or file a bug), but instead lead to "soft" failures, such as the gradual degradation of metrics, often masked, at least initially, by the normal variability in metrics tracked in PDC(s) 104 of the cloud computing environment.

For example, assume a system administrator of the cloud computing environment wants to assess how relevant are the search results generated by a search service by using a click-through rate (CTR) metric on a search results page. In one example, the formula for a Search Results Page CTR is calculated as equal to: (# of user clicks on the Search Results page)/(# of Search Results Pages shown to the user).

An example click event logged for each user click on the Search Results page is shown in Table 1. In one embodiment, for a click event to be counted in the Search Results page CTR for performance measurement purposes, the metrics calculation requires that "attributes.sessionId" is non-null.

TABLE 1

```
"payload": {
    "eventSource": "click",
    "eventType": "user",
    "locator": "searchResultPage",
    "attributes: {
        "sessionId": "123456",
        "clickSource":"SearchResult",
        "recordId": "ka0Rqwert",
        "queryId": "1tm0wa4qw8i5y"
    }
}
```

Now let's assume there has been a change made to the event logging code in one of the applications 106, 108, ... 110; for example, a new map "searchActivity" containing "sessionId" was introduced in the click event as shown in Table 2. Assume that the change has not been communicated to system administrators operating performance metrics generator 120 in NPDC 116.

TABLE 2

```
"payload": {
    "eventSource": "click",
    "eventType": "user",
    "locator": "searchResultPage",
    "attributes: {
        "searchActivity": {
        "sessionId": "123456",
        }
        "clickSource":"SearchResult",
        "recordId": "ka0Rqwert",
        "queryId": "1tmowa4qw8i5y"
    }
}
```

Since performance metrics generator 120 is not aware of the changes, all such click events would be left out of the metrics 122 calculation after the changes were deployed to production in PDC 104. This results in erroneous and misleading metrics 122.

Changes in event formats may cause other problems. Even once an event format change is identified, troubleshooting the root cause of metrics issues becomes more difficult, since there can be various scenarios where clicks could be missing, for example, a bug in the UI could be preventing clicks from being registered, preventing clicks from being logged, the events could be queued up in PDC log data queue 114, etc. In addition, in cases where multiple kinds of clicks are being tracked, in different UI experiences, it is possible that the application developer may not have changed the event format for the logged click in all possible instances in the application, so instead of logging no clicks, perhaps only a portion of clicks are unlogged. Even in cases when a change in metrics 122 results from a change in event format, determining which specific field changed in log data feeding into a metric 122 can be difficult and time-consuming (e.g., the change could result in a drop in the numerator of a metric, or the denominator of a metric, or both).

Embodiments of the invention detect unexpected errors in semi-structured log data items 112 and analyze the impact of those errors by tying the errors directly to the quality of metrics 122 using a rule-based system. One goal is to have an objective way to evaluate the quality of generated metrics on a periodic basis by examining the information gaps in logged events between the producer (e.g., the developer of applications 106, 108, . . . 110) and consumer (e.g., metrics analytics 124 in NPDC 116) of semi-structured log data items.

Figure 2:
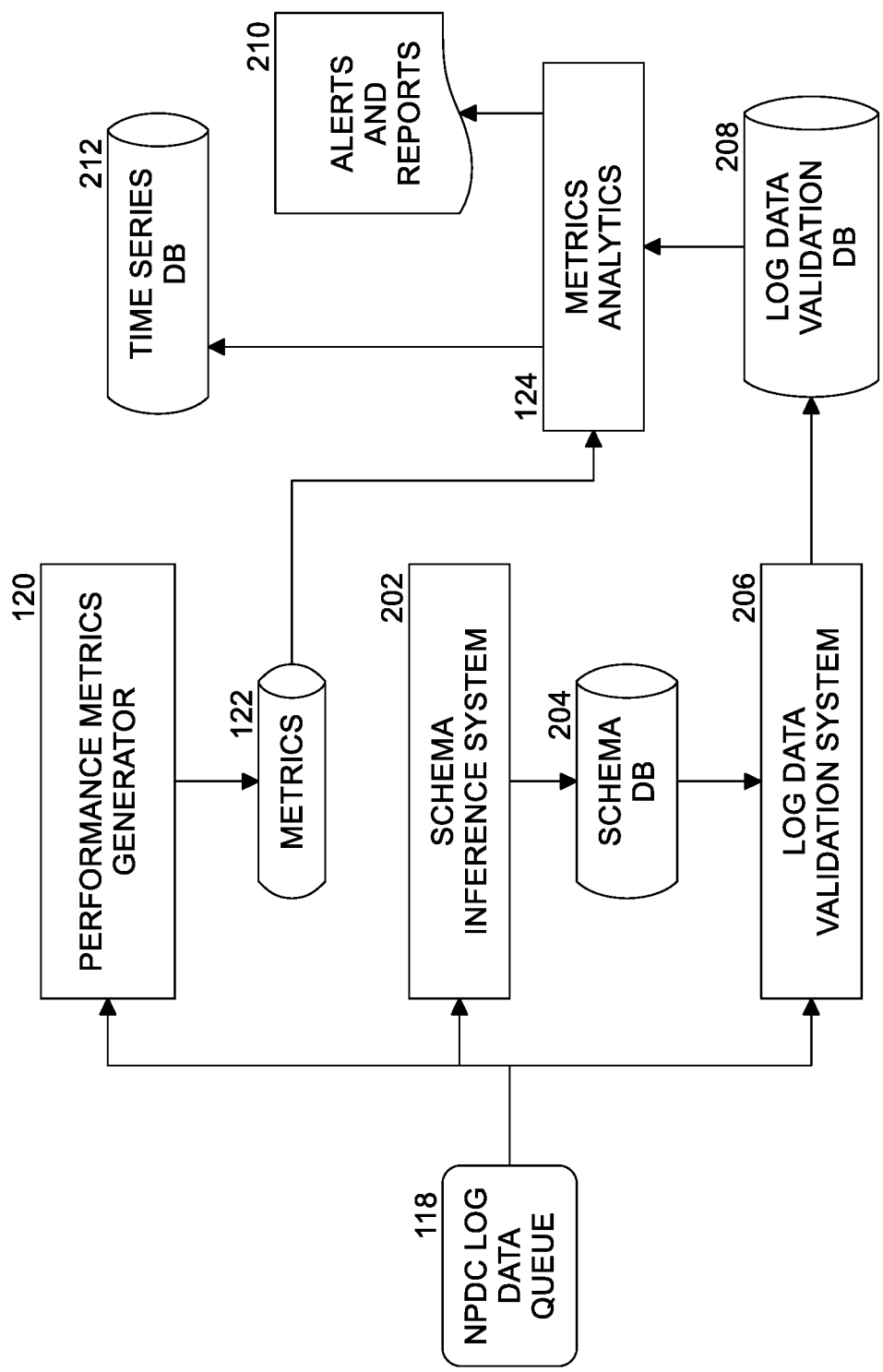
FIG. 2 is a diagram of an example schema inference and log data validation system according to some embodiments.

FIG. 2 is a diagram of an example schema inference and log data validation system 200 according to some embodiments. Performance metrics generator 120 generates metrics 122 based at least in part on log data items 112 retrieved from NPDC log data queue 118. Performance metrics generator 120 reads log data items 112 from NPDC log data queue 118, analyzes the log data items by an events generator (not shown in FIG. 2) within performance metrics generator 120 using event definitions to generate events stored in an events table and dimensions stored in a dimensions table, and analyzes the events and dimensions using metrics definitions by a metrics generator (not shown in FIG. 2) within performance metrics generator 120 to generate metrics 122. In one embodiment, performance metrics generator 120 parses log data items to find events in the log data items, wherein an event comprises at least a portion of a selected log data item matching an event definition; aggregates a plurality of performance metric definitions into a single expression; and generates a plurality of performance metrics 122 from the events, in one pass through the events, by applying the single expression to the events.

Schema inference system 202 reads log data items 112 from NPDC log data queue 118 and automatically infers one or more schemas based at least in part on analysis of the semi-structured log data items. As used herein, a schema defines the field names and data types for a dataset (e.g., log data items 112). Inferred schemas are stored in schema database (DB) 204. Log data validation system 206 reads log data items 112 from NPDC log data queue 118 and compares the log data items to inferred schemas from schema DB 204 to identify any log data item errors. Log data item errors are stored in log data validation DB 208. Metrics analytics 124 analyzes log data item errors from log data validation DB 208 with respect to metrics 122 generated by performance metrics generator 120 to determine an effect, if any, of the log data item errors on a quality measurement of metrics 122. Metrics analytics 124 generates a plurality of alerts and reports 210 as needed. Metrics analytics 124 also stores metrics 122 and/or selected log data validation DB information into time series DB 212 for possible further trend analysis. If the quality measurement does not meet a predetermined threshold, an alert (as part of alerts and reports 210) may be sent to a system administrator of NPDC 116 and/or PDC 104.

Figure 3:
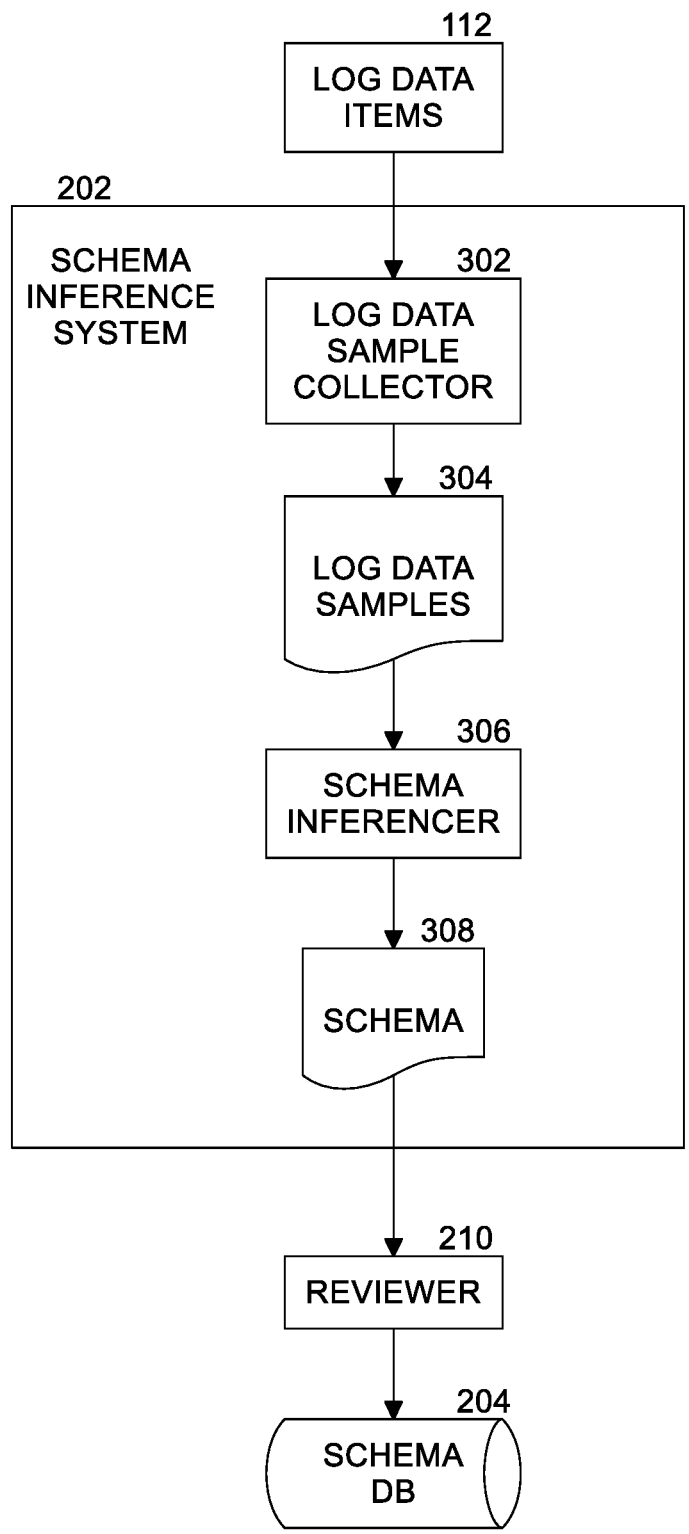
FIG. 3 is a diagram of a schema inference system according to some embodiments.

FIG. 3 is a diagram of schema inference system 202 according to some embodiments. In embodiments, one or more schemas 308 are automatically inferred for all log data items 112 that contribute to metrics generation. In an embodiment, schema inferencing may be performed every time a new release of one or more applications 106, 108, . . . 110 is deployed into production in PDC 104 for access by user devices 102, because changes in applications may result in changes to the format of log data items produced by those applications. Examples of log data items 112 include click events on a Search Results page and impression events of a Search Results page. Applications 106, 108, . . . 110 may output log data items 112 in several different formats, such as JavaScript object notation (JSON), Extensible Markup Language (XML), yet another markup language (YAML), key-value pairs, or comma separated values (CSV). In one embodiment, log data items 112 are in a semi-structured JSON format and schema inferencer 306 is implemented using an existing library called Apache® Kite software development kit (SDK) (available on the Internet at kitesdk.org) to generate one or more schemas 308 from the semi-structured JSON objects. Kite parses the log data items in the semi-structured format, determines data types of attributes, determines the structure of the data types, and produces one or more schemas 308 reflecting a format of the data types. In other embodiments, other methods of schema inferencing may be used.

Schemas 308 automatically inferred by schema inferencer 306 need to be vetted and approved by a reviewer 210 before storing the schemas in schema DB 204. Reviewer 210 is a person, such as a system administrator of PDC 104 or NPDC 116. Reviewer 210 may in some cases edit the schemas 308 to correct the schemas to more accurately reflect desired formats of the log data items. In some scenarios, there may be many schemas 308 (e.g., hundreds, thousands, or even tens of thousands of schemas in large cloud computing environments having many applications running in many PDCs 104).

In some embodiments, schema inference system 202 includes log data sample collector 302. For a given release of an application, log data sample collector 302 obtains samples 304 of log data items 112 from production logs generated by the applications running in PDC 104. Only samples 304 of log data items 112 are needed to infer schemas, rather than entire logs (which may be too large to efficiently infer schemas). In one embodiment, Spunk® Enterprise software for searching, monitoring and analyzing big data streams, commercially available from Splunk®, Inc., is used to obtain log data samples 304 from log data items 112. In other embodiments, log data samples may be collected from other sources, such as Apache® Kafka® (an open-source stream processing platform available on the Internet at kafka.apache.org), files downloaded by file transfer protocol (ftp), a Hadoop® File System (HDFS) connector if the data source is on a HDFS, etc.

As noted above, log data samples are semi-structured and may be changed for a given release of an application.

An example of a log data sample 304 is shown below:
{"eventSource": "click", "eventType": "user", "locator": "searchResultPage", "attribute" }
{"eventSource": "click", "eventType": "user", "locator": "searchResultPage", "attribute"}
{"eventSource": "click", "eventType": "user", "locator": "searchResultPage", "attribute"}

In one embodiment, schema 308 is an Avro™ schema file. Avro™ is a row-oriented remote procedure call and data serialization framework developed by the Apache® Software Foundation within Apache's Hadoop® project (available on the Internet at avro.apache.org). Avro™ uses JSON for defining data types and protocols and serializes data in a compact binary data encoding format. In another embodiment, schema 308 is in an XML scheme definition (XSD) format.

An example of a schema 308 is shown below.

```
{
  type": "record",
  "name": "payload",
  "fields": [{
    "name": "eventSource",
    "type": "string",
    "doc": "Type inferred from '\"click\"'"
  }, {
    "name": "eventType",
    "type": "string",
    "doc": "Type inferred from '\"user\"'"
  }, {
    "name": "locator",
    type": "string",
    "doc": "Type inferred from '\"searchResultPage\"'"
  }, {
    "name": "attributes",
    "type": {
      "type": "record",
      "name": "attributes",
      "fields": [{
        "name": "clickSource",
        "type": "string",
        "doc": "Type inferred from '\"SearchResult\"'"
      }, {
        "name": "sessionId",
        "type": "string",
        "doc": "Type inferred from '\"bda6d746-5192-e893\"'"
      }, {
        "name": "queryId",
        "type": "string",
        "doc": "Type inferred from '\"5y5t1zrz\"'"
      }, {
        "name": "recordId",
        "type": "string",
        "doc": "Type inferred from '\"5000M0000\"'"
      }]
    }
  }]
}
```

Figure 4:
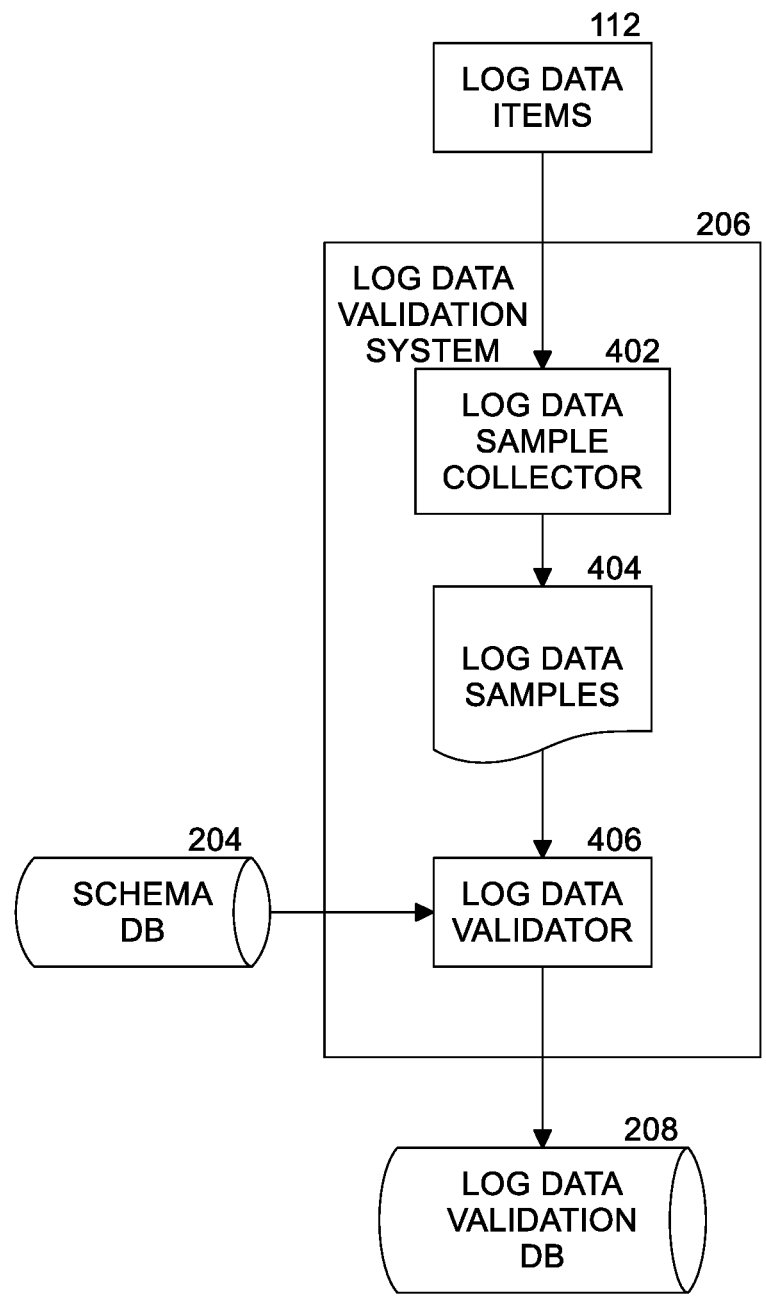
FIG. 4 is a diagram of a log data validation system according to some embodiments.

FIG. 4 is a diagram of log data validation system 206 according to some embodiments. In one embodiment, log data validation system 206 is run on a periodic basis (for example, daily, every other day, weekly, monthly, and so on) or on demand by a system administrator. Log data samples 404 are collected by log data sample collector 402 from log data items 112 in NPDC log data queue 118. Only samples 404 of log data items are needed to detect log data item errors, rather than entire logs (which may be too large to efficiently process). Log data samples 404 are validated against corresponding schemas 308 from schema DB 204 by log data validator 406. A validation summary of any detected errors is created for each run and stored in log data validation DB 208.

In one embodiment, Spunk® Enterprise software for searching, monitoring and analyzing big data streams, commercially available from Splunk®, Inc., is used to obtain log data samples 404 from log data items 112. In other embodiments, log data samples may be collected from other sources, such as Apache® Kafka® (an open-source stream processing platform available on the Internet at kafka.apache.org), files downloaded by file transfer protocol (ftp), a Hadoop® File System (HDFS) connector if the data source is on a HDFS, etc.

As noted above, log data samples 404 are semi-structured and may be changed for a given release of an application.

An example of a log data sample 404 is shown below:
{"eventSource": "click", "eventType": "user", "locator": "searchResultPage", "attribute"}
{"eventSource": "click", "eventType": "user", "locator": "searchResultPage", "attribute"}
{"eventSource": "click", "eventType": "user", "locator": "searchResultPage", "attribute"}

Log data validator 406 validates a collection of log data samples 404 against a corresponding schema 308 from schema DB 204. What should be validated depends on the specifics of the format in which the log data items are outputted, and inferred schema 308. It also depends on a specific use case. For example, the significance of the field order might play an important role in how a log data item is interpreted. In one embodiment, the types of errors log data validator 406 reports include: missing required fields, fields with unexpected data types, and fields with unexpected values. In one embodiment, log data validator 406 is implemented using open-source software Avro™ Schema Validator available on the Internet at www*npmjs*com*package*avro-schema-validator (with "." and "/" being replaced by "*" to deactivate live links). In other embodiments, other schema validators may be used. The output of log data validator 406 includes time series metrics, a validation summary and all log data item errors found during the validation process, all of which are stored in log data validation DB 208. The time series metrics may include a count of each type of error. In one embodiment, the validation summary includes a total number of log data items processed, a total number of valid log data items, a violation map comprising a summary of each type of log data item error found from the schema comparison and the number of log data items that have the specific error. In one embodiment, the violation map is a mapping from (field, type of error, schema version, log type) to the number of errors found.

An example of a violation map stored in log data validation DB 208 is below.
[errorType=missing_value, field=attributes.sessionId, schema=rel_10_search_results_click.avsc, logType=searchui]→105
[errorType=missing_value, field=attributes.recordId, schema=rel_10_search_results_click.avsc, logType=searchui]→28
[errorType=wrong_datatype, field=attributes.recordId, schema=rel_10_search_results_click.avsc, logType=searchui]→5

An example of a list of log data item errors stored in log data validation DB 208 is below.
{"errorCategory":{"errorType":"missing_value","field": "attributes.sessionId","schema":
{"errorCategory":{"errorType":"wrong_datatype","field": "attributes.recordId","schema":
. . . .

Figure 5:
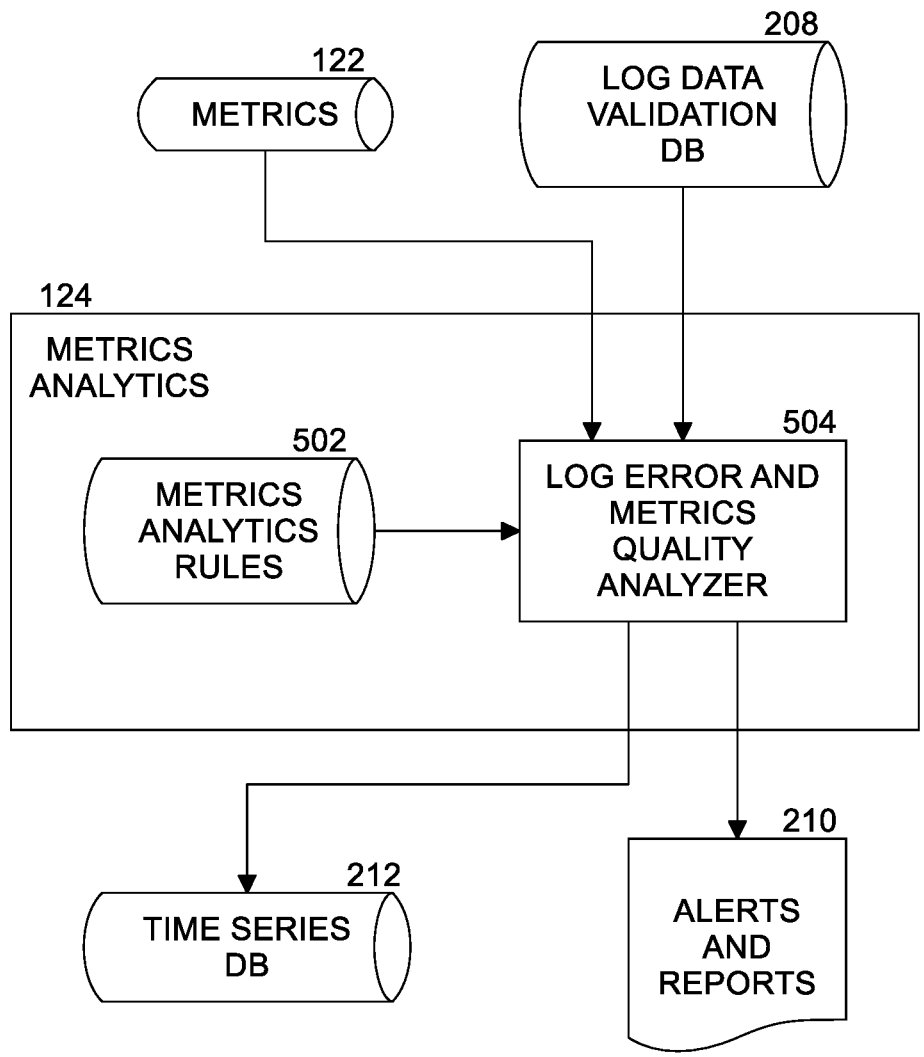
FIG. 5 is a diagram of a metrics analytics tool according to some embodiments.

FIG. 5 is a diagram of metrics analytics 124 according to some embodiments. Given a set of metrics analytics rules 502, log error and metrics quality analyzer 504 of metrics analytics 124 examines each type of log data item error in log data validation DB 208 reported by log data validator 406 and analyzes the impact of the log data item errors on metrics 122 produced by performance metrics generator 120. The analysis may trigger alerts in alerts and reports 210 to be emailed to a system administrator if the errors cause an impact to a quality measurement of one or more metrics 122 such that the quality measurement fails to meet a predetermined threshold. One type of log data item error may have an impact on multiple metrics, with varying degrees of impact.

Time series metrics generated by log data validator 406 are uploaded to time series DB 212 for trend analysis. In one embodiment, an open source time series monitoring and alerting platform called Argus (available on the Internet at openargus.org) is used as time series DB 212.

An example of a metrics analytics rule is when a number of log data item errors in log data items used by a metric 122 is more than 5% of the log data items used, then send an alert.

In an example, assume an event is being processed, such as a search_initiation_event as follows:
{
    "event": "search_initiation_event",
    "platform": "LEX",
    "selectors": {
        "appName": "one:one",
        "payload_eventSource": "synthetic-click",
        "payload_locator_scope": "search-input-desktop",
        "payload_locator_target": "search-input"
    },
    "not_null_fields": ["payload_attributes_searchDialogSessionId"],
    "null_fields": [ ]
}
For this event, the number of times the payload_attributes_searchDialogSessionId is null may be tracked. For example, if a current error rate is approximately 4%, the following metrics are examples of metrics that may use the search_initiation_event: val and oer. The metric may be:
Metric
={
  new Metric(
  "OER",
  Seq("LEX", "ES"),
  castAndSum(col("ta_clk")||col("ta_preview_clk")||col("mru_clk")||col("mru_preview_clk")||col("lv_clk")||col("lv_preview_clk")||col("cq_clk")||col("rr_clk")||col("search_result_clk")),
  castAndSum(col("search_initiation_event"))
  )
}
val
mruCoverage:
Metric={
  new Metric(
  "MRU_IR_Coverage",
  Seq("LEX", "ES"),
  castAndSum(when(col("mru_imp")>0, 1).otherwise(0)),
  castAndSum(col("search_initiation_event"))
  )
}
val
querySuggestionCoverage:
Metric={
  new Metric(
  "Query_Suggestion_IR_Coverage",
  Seq("ES"),
  castAndSum(when(col("qs_imp")>0, 1).otherwise(0)),
  castAndSum(col("search_initiation_event"))
  )
}
val
deflectionClickRate:
Metric={
  new Metric(
  "Deflection_Rate",
  Seq("LEX", "ES"),
  castAndSum(col("ta_clk")||col("ta_preview_clk")||col("mru_clk")||col("mru_preview_clk")||col("lv_clk")||col("lv_preview_clk")), castAndSum(col("search_initiation_event"))
  )
}
If there are problems with the search_intiation_event (for example, because the payload_attributes_searchDialogSessionId is null), then that means there is a problem with all metrics that use this event.

In one embodiment, the search_intiation_event is a denominator in all metrics that use this event. For example, for the deflectionClickRate metric:
    numerator: castAndSum(col("ta_clk")||col("ta_preview_clk")||col("mru_clk")||col("mru_preview_clk")||col("lv_clk")||col("lv_preview_clk")),
    denominator: castAndSum(col("search_initiation_event")) or more simply: deflection_rate=numerator/denominator.

A 4% loss on those events means the metric computed based on those events will overestimate by 4%. If, in addition to problems with search_initiation_event, there are problems with the event mru_clk, perhaps causing a loss of 9% of those events, then the (adjusted) metric computed should be:

$$\text{deflection\_rate}=(\text{ta\_clk}+\text{ta\_preview\_clk}+1.09*\text{mru\_clk}+\text{mru\_preview\_clk}+\text{lv\_clk}+\text{lv\_preview\_clk})/(\text{search\_initiation\_event}*1.04)$$

In an embodiment, a forecasting component may provide forecast estimates, in one example, for the events:
ta_clk, ta_preview_clk, mru_clk, mru_preview_clk, lv_clk, lv_preview_clk
and search_initiation_event
This would then allow a forecasted metric to be computed, as well as the expected compute metric based on sample errors: ta_clk, =30, ta_preview_clk, =4, mru_clk, =20, mru_preview_clk, =4, lv_clk, =3, lv_preview_clk=1, search_initiation_event=100.

$$\text{forecast}=(30+4+20+4+3+1)/100=0.62$$

$$\text{actual}=(30+4*0.91+20+4+3+1)/100*0.96=0.59$$

A rule for deflection_rate in one example is:

if abs(forecast-actual)>0.25 then alert

Thus, in this case, an alert would be generated.

An example illustrating a log data item error for an event called
"search_results_page_click" to an example metric is shown below.
Example Metric: Search Results Page CTR
Numerator: # of search_results_page_click events
Denominator: # of search_results_page_impression events
    In one example, the following selectors are used to filter an event such as
"search_results_page_click" from all log data items.
"eventSource": "click"
"eventType": "user"
"locator": "searchResultPage"
"attributes.sessionId" is not null In one example, the following selectors are used to filter an event such as
"search_results_page_impression" from all log data items.
"eventSource": "refresh"
"eventType": "user"
"locator": "searchResultPage"
"attributes.sessionId" is not null For example, assume a bug was introduced in a patch release for application 2 108. The bug may be, for example, that the logging code left out "attributes.sessionId" when logging the search_results_page_click log data item. Log data validation system 206 would report errors for "missing required field" for "attributes.sessionId" in the search_results_page_click event for PDCs 104 that have the patch release. In this example, having fewer search_results_page_click events would decrease the Search Results Page CTR metric.

In one embodiment, if metrics 122 have been produced by performance metrics generator 120 for a given time period (such as a day), metrics analytics 124 may be able to estimate a more realistic CTR. Metrics analytics 124 knows which events are affected by log data item errors from the event definitions in performance metrics generator 120. Metrics analytics 124 knows which metrics are impacted and how they are impacted by the affected events from the metrics definitions in performance metrics generator 120 (e.g., the type of event is counted in the numerator and/or the denominator of a metric). Metrics analytics 124 can estimate the number of search_results_page_click events that should be computed based on the percentage of errors being seen for that type of event from the output of log data validation system 206. Metrics analytics 124 can then estimate the actual CTR.

If metrics 122 have not been produced by performance metrics generator 120 for that time period (e.g., that day), metric analytics 124 may forecast what metrics the performance metrics generator might produce. Metrics analytics 124 can estimate the expected and actual (metric calculated without logging errors) Search Results Page CTR based on forecasts and the percentage of errors being seen for that type of event from the output of log data validation system 202. Log error and metrics quality analyzer 504 sends out alerts if the difference between an expected and actual metric is above a threshold specified in metrics analytics rules 502.

Figure 6:
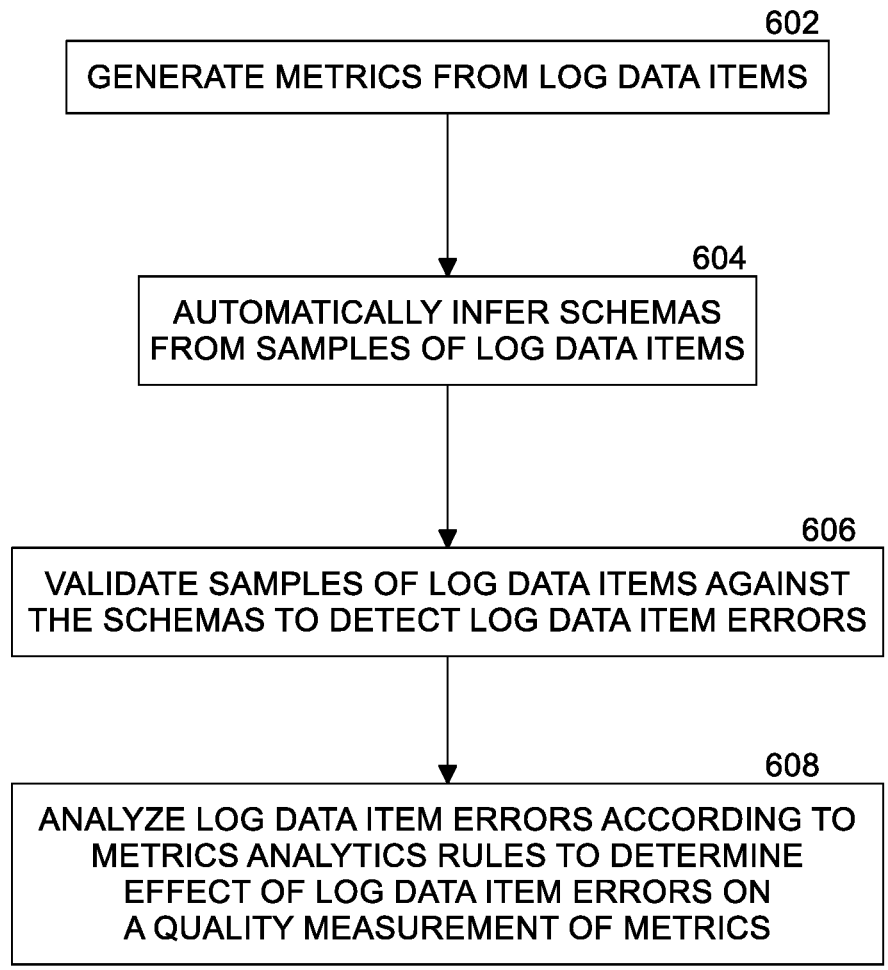
FIG. 6 is a flow diagram of schema inference and log data validation processing according to some embodiments.

FIG. 6 is a flow diagram 600 of schema inference and log data validation processing according to some embodiments. At block 602, performance metrics generator generates metrics from log data items. The log data items are generated by applications running in a computing system. At block 604, schema inference system 202 automatically infers schemas from samples of the log data items. At block 606, log data validation system 206 validates samples of the log data items against the schemas to detect log data item errors. At block 608, metrics analytics analyzes the log data item errors according to metrics analytics rules to determine the effect of the log data item errors on a quality measurement of the metrics.

Example Electronic Devices and Environments.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, computer server, cloud computing server, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
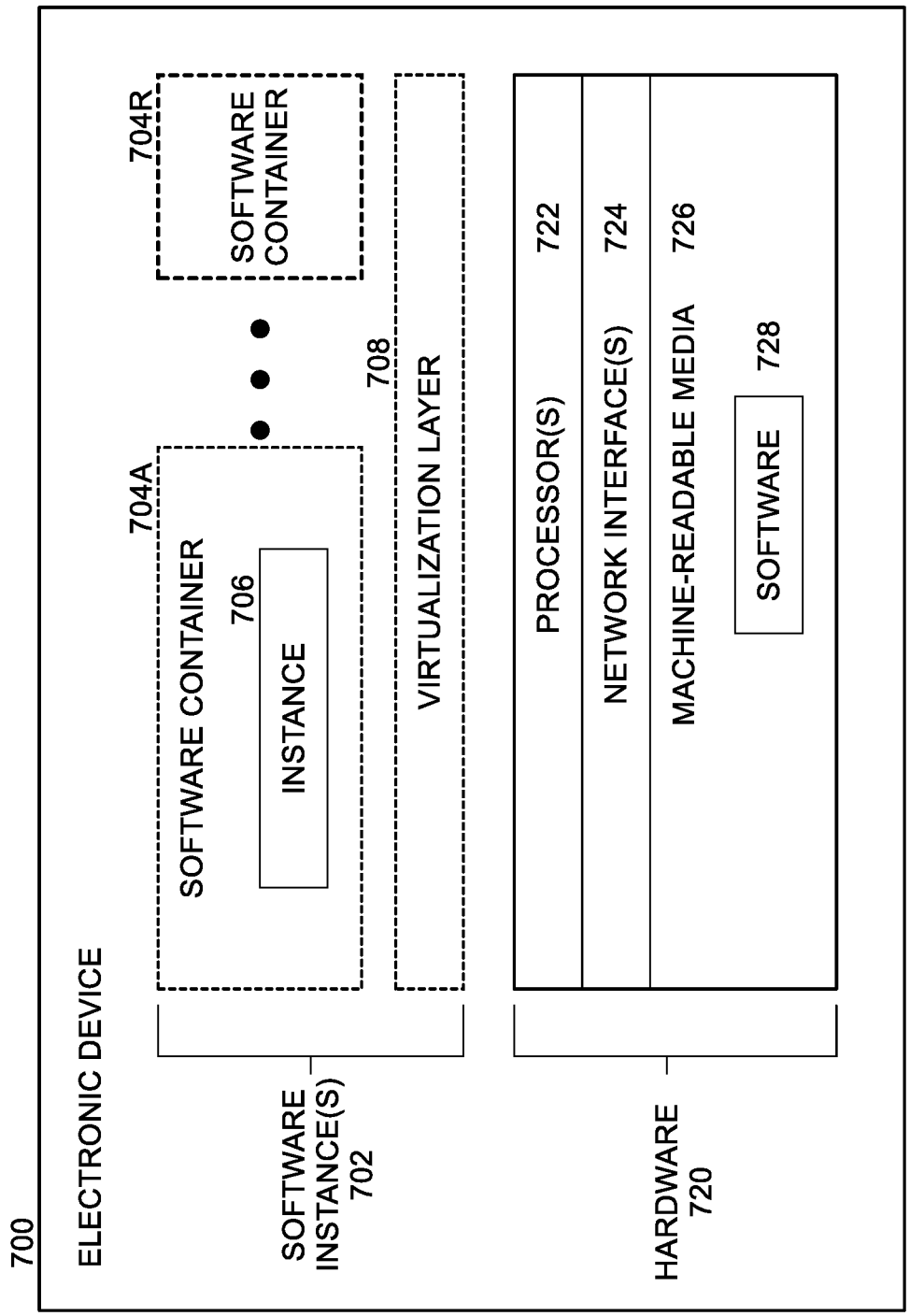
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable media. Each of the previously described clients and schema inference and log data validation system 200 may be implemented in one or more electronic devices 700. In one implementation: 1) each of the clients is implemented in a separate one of the electronic devices 700 (e.g., in end user devices where the software 728 represents the software to implement clients to interface directly and/or indirectly with the schema inference and log data validation system 200 (e.g., software 728 represents a web browser, a native client, a portal, a command-line interface, and/or an application programming interface (API) based upon protocols such as Simple Object Access Protocol (SOAP), Representational State Transfer (REST), etc.)); 2) the schema inference and log data validation system 200 is implemented in a separate set of one or more of the electronic devices 700 (e.g., a set of one or more server devices where the software 728 represents the software to implement the schema inference and log data validation system 200); and 3) in operation, the electronic devices implementing the clients and the schema inference and log data validation system 200 would be communicatively coupled (e.g., by a network) and would establish between them (or through one or more other layers and/or or other services) connections for submitting UI interactions log data to the schema inference and log data validation system 200 and returning alerts and reports 122, and time series DB 124 to the clients. Other configurations of electronic devices may be used in other implementations (e.g., an implementation in which the client and the schema inference and log data validation system 200 are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

EXAMPLE ENVIRONMENT

Figure 7B:
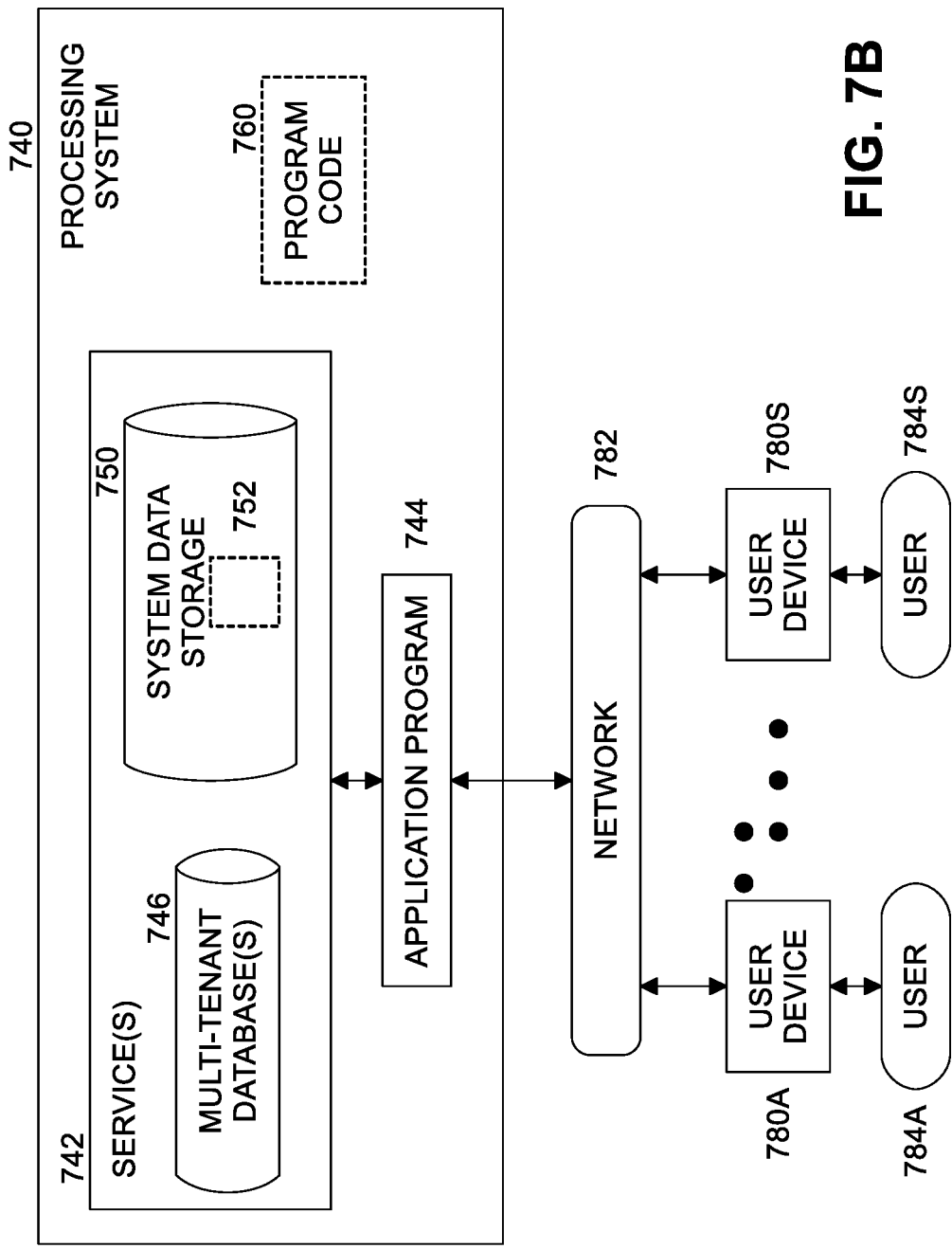
FIG. 7B is a block diagram of a deployment environment according to some example implementations.

FIG. 7B is a block diagram of a deployment environment according to some example implementations. A system 740 includes hardware (e.g., a set of one or more server devices) and software to provide service(s) 742, including the schema inference and log data validation system 200. In some implementations, the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700. In some embodiments, service(s) 742 includes schema inference and log data validation system 200.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: schema inference and event validation processing, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the schema inference and log data validation system 200, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™, or Python using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:
generating metrics from log data items;
automatically inferring one or more schemas based at least in part on analyzing samples of the log data items;
validating the samples of the log data items against the one or more schemas to detect log data item errors; and
analyzing the log data item errors according to metrics analytics rules to determine an effect of the log data item errors on a quality measurement of the metrics.

2. The computer-implemented method of claim 1, wherein the log data items represent user interface (UI) interactions by a user of an application program running on a production computing system and the metrics measure performance of the UI interactions by the production computing system.

3. The computer-implemented method of claim 2, comprising automatically inferring the one or more schemas when a new release of the application program is deployed to the production computing system.

4. The computer-implemented method of claim 1, wherein the generating the metrics, automatically inferring the one or more schemas, validating the samples of the log data items, and analyzing the log data item errors are performed on a non-production computing system.

5. The computer-implemented method of claim 1, wherein the log data items comprise semi-structured JavaScript object notation (JSON) objects containing collections of key-value pairs.

6. The computer-implemented method of claim 1, comprising validating the samples of the log data items against the one or more schemas to detect the log data item errors on a periodic basis.

7. The computer-implemented method of claim 1, comprising generating a violation map summarizing each type of log data item error and a number of the log data items having the type of log data item error.

8. The computer-implemented method of claim 1, comprising sending an alert when the effect of the log data item errors on the quality measurement of the metrics causes the quality measurement to fail to meet a predetermined threshold.

9. An apparatus comprising:
a performance metrics generator to generate metrics from log data items;
a schema inferencer to automatically infer one or more schemas based at least in part on analyzing samples of the log data items; and
a log data validator to validating the samples of the log data items against the one or more schemas to detect log data item errors.

10. The apparatus of claim 9, comprising validating samples of the log data items against the one or more schemas to detect log data item errors on a periodic basis.

11. The apparatus of claim 9, wherein the log data items comprise semi-structured JavaScript object notation (JSON) objects containing collections of key-value pairs.

12. The apparatus of claim 9, wherein the log data items represent user interface (UI) interactions by a user of an application program running on a production computing system and the metrics measure performance of the UI interactions by the production computing system.

13. The apparatus of claim 12, comprising the schema inferencer to automatically infer the one or more schemas when a new release of the application program is deployed to the production computing system.

14. The apparatus of claim 9, comprising:
a metrics analyzer to analyze the log data item errors according to metrics analytics rules to determine an effect of the log data item errors on a quality measurement of the metrics.

15. The apparatus of claim 14, comprising the metrics analyzer to generate a violation map summarizing each type of log data item error and a number of the log data items having the type of log data item error.

16. The apparatus of claim 14, comprising the metrics analyzer to send an alert when the effect of the log data item errors on the quality measurement of the metrics causes the quality measurement to fail to meet a predetermined threshold.

17. A non-transitory machine-readable storage medium that provides instructions that, if executed by one or more processors, are configurable to cause the one or more processors to perform operations comprising:
generating metrics from log data items;
automatically inferring one or more schemas based at least in part on analyzing samples of the log data items;
validating the samples of the log data items against the one or more schemas to detect log data item errors; and
analyzing the log data item errors according to metrics analytics rules to determine an effect of the log data item errors on a quality measurement of the metrics.

18. The non-transitory machine-readable storage medium of claim 17, wherein the log data items represent user interface (UI) interactions by a user of an application program running on a production computing system and the metrics measure performance of the UI interactions by the production computing system.

19. The non-transitory machine-readable storage medium of claim 18, comprising instructions to automatically infer the one or more schemas when a new release of the application program is deployed to the production computing system.

20. The non-transitory machine-readable storage medium of claim 17, wherein instructions to generate the metrics, automatically infer the one or more schemas, and validate the samples of the log data items are performed on a non-production computing system.

\* \* \* \* \*